Patented July 22, 1952

2,604,463

UNITED STATES PATENT OFFICE 2,604,463

CROSS-LINKABLE AND CROSS-LINKED VINYL TYPE COPOLYMERS

John Alexander Bilton, Beloeil Station, Quebec, and Gordon Hart Segall, McMasterville, Quebec, Canada, assignors to Canadian Industries Limited, Montreal, Quebec, Canada, a corporation of Canada No Drawing. Application January 27, 1951, Serial No. 208,246. In Canada April 28, 1949

16 Claims. (Cl. 260—80.5)

This invention relates to new polymeric materials. More particularly, it relates to new vinyl-type copolymers and methods of making the same. Still more particularly, it relates to new vinyl-type copolymers which are capable of cross-linking upon heat treatment, to these copolymers in the cross-linked state and to methods of making the same.

This application is a continuation-in-part of our application Serial No. 144,852, filed on February 17, 1950, now abandoned.

It has heretofore been the practice to prepare cross-linked polymeric materials from styrene by copolymerizing styrene with divinyl benzene. However, due to the identical activity of the vinyl bonds in the divinyl benzene, it has been impossible to obtain a thermoplastic product at any stage of the copolymerization except at very low conversions. Cross-linking occurs simultaneously with linear polymerization and the end product is highly cross-linked. If, instead of divinyl benzene, there is used a vinyl monomer containing a less active double bond, e. g. a vinyl allyl compound, it is possible, by careful control of polymerization conditions, to obtain a linear thermoplastic styrene copolymer which subsequently can be cross-linked through the allyl group. However, since an allyl group differs from a vinyl group only in the degree with which it polymerizes, it is difficult to exclude the possibility of cross-linking during the initial polymerization. Accordingly the range of polymerization conditions is seriously limited and there is a constant danger of gelation with loss of the polymer charge.

The formation of a thermoplastic product at an intermediate stage of the production of cross-linked polymers is particularly important in the protective coating field where it is highly desirable to prepare a linear thermoplastic polymer, apply it to the articles to be coated and then cross-link it by baking.

It has now been found that, if styrene is copolymerized with an acid selected from the group consisting of acrylic acid, methacrylic acid and crotonic acid, and a glycidyl ester selected from the group consisting of glycidyl acrylate, glycidyl methacrylate and glycidyl crotonate, and under such conditions that no reaction occurs between the epoxide ring of the glycidyl ester and the carboxylic acid group of the acid, the above difficulties are completely overcome. There is obtained a linear thermoplastic copolymer which is substantially free of any cross-linkage and which becomes cross-linked through reaction of the epoxide rings with the free carboxylic acid groups only upon heat treatment.

It has also been found that the above method can be applied generally to polymerizable monoethylenically unsaturated compounds free of groups reactive with epoxide rings and carboxylic acid groups.

It is therefore an object of this invention to provide new and improved polymeric materials.

Another object of this invention is to provide new vinyl-type copolymers having improved properties.

A further object of this invention is to provide new vinyl-type copolymers which are capable of cross-linking upon heat treatment, and a method of preparing the same.

An additional object of this invention is to provide new cross-linked vinyl-type copolymers, and a method of preparing the same.

Other and additional objects of the invention will become apparent hereinafter.

The objects of the invention are accomplished, in general, by copolymerizing an acid selected from the group consisting of acrylic acid, methacrylic acid and crotonic acid, and a glycidyl ester selected from the group consisting of glycidyl acrylate, glycidyl methacrylate and glycidyl crotonate, with one or more polymerizable monoethylenically unsaturated compounds free of groups reactive with epoxide rings and carboxylic acid groups, at a temperature of from 50° C. to 75° C., and in the presence of an addition polymerization catalyst, the glycidyl ester and the acid each being used in an amount sufficient to cause cross-linking of the copolymer upon heat treatment and together being used in an amount not exceeding 20% by weight of the total polymerizable mass. The linear thermoplastic copolymer thus obtained is thereafter cross-linked by heating to a temperature of from 100° C. to 150° C.

The formation of the linear thermoplastic copolymer is effected by addition polymerization of the monomers through their ethylenic groups. The general nature of the cross-linking mechanism will become apparent from the following equation showing the transformation of a methyl acrylate-glycidyl acrylate-acrylic acid copolymer upon heat treatment.

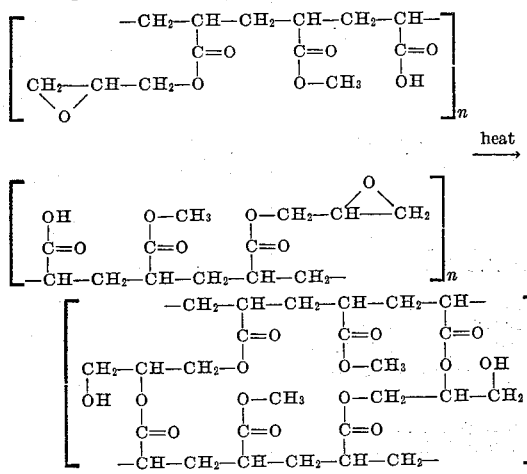

The details and manners of practising the invention will be apparent by reference to the following specific examples in which the parts are given by weight, it being understood that these examples are merely illustrative embodiments of the invention and that the scope of the invention is not limited thereto.

*Example 1*

Solutions of copolymers of styrene, glycidyl methacrylate and methacrylic acid, with or without methyl acrylate, were prepared by dissolving various proportions of each monomer in a mixture of methyl ethyl ketone and xylene and heating at 60° C. for 24 hours in the presence of 2 parts of azo-bis(isobutyronitrile).

The following table shows the proportions of the monomers in the order styrene-methyl acrylate-glycidyl methacrylate-methacrylic acid, the proportions of the solvents, the degree of conversion of the monomers after the heating period and the viscosity of the linear thermoplastic copolymer solution obtained.

| Solution No. | Monomer, Parts | Methyl ethyl Ketone, Parts | Xylene, Parts | Conversion, Per Cent | Viscosity, Poises |
|---|---|---|---|---|---|
| 1 | 85-0-9-6 | 50 | 50 | 76 | 1.4 |
| 2 | 70-15-9-6 | 50 | 50 | 84 | 2.5 |
| 3 | 60-25-9-6 | 50 | 50 | 77 | 1.4 |
| 4 | 50-35-9-6 | 50 | 50 | 83 | 2.0 |
| 5 | 50-30-10-10 | 50 | 50 | 90 | [1] 2.25 |
| 6 | 45-40-9-6 | 50 | 50 | 82 | 3.4 |
| 7 | 42-42-8-8 | 50 | 50 | 89 | [1] 1.25 |
| 8 | 40-40-15-10 | 33.3 | 66.6 | ------ | gel |
| 9 | 40-40-12-8 | 75 | 75 | 76 | 1.4 |
| 10 | 40-40-10-10 | 50 | 50 | 92 | [1] 2.5 |
| 11 | 40-38-10-12 | 50 | 50 | ------ | gel |
| 12 | 30-30-24-16 | 50 | 100 | ------ | gel |

[1] Viscosity of solution diluted to 35% total solids with equal parts of methyl ethyl ketone and xylene.

Gelation occurred in solutions 8, 11 and 12. Films were cast from the other solutions and such films were heated. After heating at 150° C. for thirty minutes, the films were not dissolved by acetone which is a solvent for the unheated material, and they had good impact flexibility, gloss and hardness greater than 8 H on the pencil scale.

*Example 2*

Copolymers of styrene, glycidyl acrylate and acrylic acid, with or without methyl acrylate, were prepared by dissolving the monomers in a solvent mixture containing equal parts of methyl ethyl ketone and xylene and heating the solutions at 60° C. for 24 hours in the presence of 2 parts of azo-bis(isobutyronitrile).

The following table shows the proportions of the monomers in the order styrene-methyl acrylate-glycidyl acrylate-acrylic acid, the proportions of the solvents, the degree of conversion of the monomers after the heating period and the viscosity of the linear thermoplastic copolymer solution obtained.

| Solution No. | Monomer, Parts | Methyl ethyl Ketone, Parts | Xylene, Parts | Conversion, Per Cent | Viscosity, Poises |
|---|---|---|---|---|---|
| 1 | 85-0-9-6 | 50 | 50 | 79 | 1.25 |
| 2 | 70-15-9-6 | 50 | 50 | 84 | 1.40 |
| 3 | 60-25-9-6 | 50 | 50 | 84 | 2.5 |
| 4 | 50-35-9-6 | 50 | 50 | 85 | 2.5 |

Films were cast from the above solutions and such films were heated. After heating at 150° C. for thirty minutes, the films swelled and softened in acetone but were not dissolved thereby. They also had good impact flexibility.

*Example 3*

45 parts of styrene, 40 parts of methyl acrylate, 9 parts of glycidyl methacrylate and 6 parts of methacrylic acid were dissolved in 50 parts of methyl ethyl ketone and 50 parts of xylene, and the solution was heated at 70° C. for 15 hours in the presence of 2 parts of azo-bis(isobutyronitrile). A monomer conversion of 94% was thus obtained and the resultant linear thermoplastic copolymer solution had a viscosity of 3.70 poises. A film was thereafter cast from this solution which, after heating at 150° C. for 45 minutes, was insoluble in acetone and had a very good impact flexibility.

A solution similar to the above was also heated at 70° C. for 15 hours but in the presence of 1 part of azo-bis(isobutyronitrile). A monomer conversion of 85% was observed and the resultant thermoplastic copolymer solution had a viscosity of 3.20 poises. A film cast from the copolymer solution and heated at 150° C. for 45 minutes was insoluble in acetone and had an excellent impact flexibility.

*Example 4*

In 70 parts of isopropyl alcohol and 30 parts of xylene, there were dissolved 40 parts of styrene, 40 parts of methyl acrylate, 10 parts of glycidyl methacrylate and 10 parts of methacrylic acid. The solution was heated at 60° C. for 24 hours in the presence of 2 parts of azo-bis(isobutyronitrile) after which time 99% monomer conversion was observed and a thermoplastic copolymer solution was obtained having a viscosity of 8.84 poises and, when diluted to 35% total solids, 1.25 poises. The solution was then cast into a film which, after heating at 150° C. for 30 minutes, was insoluble in acetone and had a very good impact flexibility.

*Example 5*

A 94% monomer conversion was obtained by heating at 70° C. for 18 hours in the presence of 2 parts of azo-bis(isobutyronitrile), a solution of 55 parts of styrene, 30 parts of methyl acrylate, 9 parts of glycidyl methacrylate and 6 parts of methacrylic acid in 100 parts of isopropyl alcohol and 50 parts of xylene. The resultant thermoplastic copolymer solution had a viscosity less than 0.5 poise when diluted to 25% total solids.

Example 6

45 parts of styrene, 40 parts of methyl acrylate, 9 parts of glycidyl methacrylate and 6 parts of methacrylic acid were dissolved in 99 parts of xylene and 1 part of hexyl mercaptan, and the solution was heated at 60° C. for 24 hours in the presence of 2 parts of azo-bis(isobutyronitrile). There was obtained a monomer conversion of 81% and the resultant thermoplastic copolymer solution had a viscosity of 10 poises.

A copolymer solution similar to the above was prepared but using 50 parts of pinene and 50 parts of xylene as solvents. A 90% monomer conversion was observed and the thermoplastic copolymer solution obtained had a viscosity of 8.84 poises.

Example 7

90 parts of vinyl acetate were copolymerized with 7 parts of glycidyl methacrylate and 3 parts of methacrylic acid by heating at 50° C. for 36 hours in 50 parts of acetone and in the presence of 0.75 part of azo-bis(isobutyronitrile). A film was thereafter cast from the resultant thermoplastic copolymer solution which, after heating at 100° C. for 2.66 hours, was only slightly dissolved by acetone.

Example 8

A solution of 50 parts of styrene, 35 parts of methyl methacrylate, 9 parts of glycidyl methacrylate and 6 parts of methacrylic acid in 50 parts of methyl ethyl ketone and 50 parts of xylene was prepared and heated at 60° C. for 20 hours in the presence of 2 parts of azo-bis(isobutyronitrile). A monomer conversion of 89% was thus obtained and the resultant thermoplastic copolymer solution had a viscosity of 3.0. A film was then cast from the copolymer solution and such film was heated. After heating at 150° C. for 30 minutes, the film was insoluble in acetone.

Example 9

Solutions of copolymers of styrene, acrylonitrile, glycidyl methacrylate, methacrylic acid, with or without methyl acrylate, were prepared by dissolving various proportions of each monomer in xylene and/or methyl ethyl ketone and heating at 60° C. for 20 hours in the presence of 2 parts of azo-bis(isobutyronitrile).

The following table shows the proportions of the monomers in the order styrene-methyl acrylate-acrylonitrile-glycidyl methacrylate-methacrylic acid, the proportions of the solvents, the degree of conversion of the monomers after the heating period and the viscosity of the linear thermoplastic copolymer solution obtained.

| Solution No. | Monomer, Parts | Methyl ethyl Ketone, Parts | Xylene, Parts | Conversion, Per Cent | Viscosity, Poises |
|---|---|---|---|---|---|
| 1 | 65-0-20-9-6 | 100 | | 94 | 8.8 |
| 2 | 45-20-20-9-6 | 50 | 50 | 88 | [1] 5.5 |
| 3 | 50-20-15-9-6 | 50 | 50 | 83 | 3.7 |

[1] Viscosity of solution diluted to 35% total solids with equal parts of methyl ethyl ketone and xylene.

Films were cast from the above solutions and such films were heated. After heating at 150° C. for 30 minutes, the films were insoluble in acetone and had a very good impact flexibility.

Example 10

In 50 parts of methyl ethyl ketone and 50 parts of xylene, there were dissolved 80 parts of methyl methacrylate, 12 parts of glycidyl methacrylate and 8 parts of methacrylic acid. The solution was heated at 60° C. for 5 hours in the presence of 2 parts of azo-bis(isobutyronitrile), after which time 89% monomer conversion to thermoplastic copolymer was observed. The solution was then cast into a film which, after heating at 150° C. for 30 minutes, was insoluble in acetone.

Example 11

84% monomer conversion to thermoplastic copolymer was obtained by heating at 60° C. for 20 hours, in the presence of 2 parts of azo-bis-(isobutyronitrile), a solution of 85 parts of methyl methacrylate, 9 parts of glycidyl methacrylate and 6 parts of methacrylic acid in 50 parts of methyl ethyl ketone and 50 parts of xylene. A film cast from the copolymer solution was insoluble in acetone after heating at 150° C. for 30 minutes.

Example 12

55 parts of methyl methacrylate were copolymerized with 30 parts of methyl acrylate, 9 parts of glycidyl methacrylate and 6 parts of methacrylic acid by heating at 60° C. for 20 hours in 100 parts of isopropyl alcohol and 50 parts of xylene and in the presence of 2 parts of azo-bis(isobutyronitrile). 100% monomer conversion was obtained and the resultant thermoplastic copolymer solution had a viscosity of 1.25 poises when diluted to 34% total solids. A film was cast from the copolymer solution and such film was heated. After heating at 150° C. for 30 minutes, the film was insoluble in acetone and had a good impact flexibility.

Example 13

85 parts of methylacrylate, 9 parts of glycidyl acrylate, 6 parts of acrylic acid and 2 parts of azo-bis(isobutyronitrile) were dissolved in 50 parts of methyl ethyl ketone and 50 parts of xylene and the solution was heated at 60° C. for 20 hours. There was thus obtained a 92% monomer conversion and the resultant thermoplastic copolymer had a viscosity of 3.2 poises. A film cast from the solution and heated at 150° C. for 30 minutes swelled in acetone but was undissolved thereby. The film was unattacked by xylene.

Example 14

50 parts of vinyl chloride, 5 parts of glycidyl methacrylate, and 3 parts of methacrylic acid were dissolved in 100 parts of methyl ethyl ketone and the solution was heated in a rocking bomb in the absence of air at 65° C. for 10 hours in the presence of 0.5 part of azo-bis(isobutyronitrile). The resulting polymer solution was concentrated and a film cast from a 30% solution. The film on baking at 150° C. for 30 minutes became insoluble in acetone.

Example 15

In 50 parts of methyl ethyl ketone and 50 parts of xylene, there were dissolved 45 parts of styrene, 4 parts of methacrylonitrile, 9 parts of glycidyl methacrylate, 6 parts of methacrylic acid and 2 parts of azo-bis(isobutyronitrile), and the resultant solution was heated at 60° C. for 24 hours. A film was thereafter cast from the copolymer solution which, after heating at 150° C. for 30 minutes, was insoluble in acetone.

Example 16

60 parts of styrene, 9 parts of glycidyl methacrylate and 6 parts of methacrylic acid were copolymerized in separate experiments with 25 parts of ethyl acrylate, butyl acrylate, isobutyl acrylate, ethyl hexyl acrylate, methyl alpha-chloroacrylate, ethyl methacrylate, butyl methacrylate and dodecyl methacrylate, by heating at 60° C. for 24 hours in 50 parts of methyl ethyl ketone and 50 parts of xylene and in the presence of 2 parts of azo-bis(isobutyronitrile). Films were cast from each copolymer solution which, after heating at 150° C. for 30 minutes, were insoluble in acetone, hard, colorless and glossy.

Example 17

65 parts of styrene, 20 parts of methyl acrylate, 9 parts of glycidyl methacrylate, 6 parts of methacrylic acid and 2 parts of dodecyl mercaptan were emulsified in 300 parts of water, 10 parts of sorbitan monolaurate polyoxyethylene derivative and 2 parts of potassium persulphate. The emulsion was heated at 50° C. for 23 hours under nitrogen after which time the resultant copolymer was precipitated by pouring the emulsion into methanol. It was then filtered, washed with water and dried. The copolymer was thereafter dissolved in methyl ethyl ketone to give a solution having a viscosity of 5.5 poises at 33% total solids and a film was cast from this solution. After heating at 150° C. for 30 minutes, this film was insoluble in acetone and had a good hardness and flexibility.

Example 18

45 parts of styrene, 40 parts of methyl acrylate, 9 parts of glycidyl methacrylate and 6 parts of methacrylic acid were copolymerized in separate experiments by heating at 60° C. for 24 hours in 50 parts of methyl ethyl ketone and 50 parts of xylene and in the presence of 1, 2 and 3 parts of benzoyl peroxide.

The following table shows the amounts of benzoyl peroxide, the degree of conversion of the monomer after the heating period and the viscosity of the linear thermoplastic copolymer solution obtained.

| Benzoyl peroxide, parts | Conversion, percent | Viscosity, poises | Total Solid, percent |
|---|---|---|---|
| 1 | 58 | 1.25 | 29 |
| 2 | 70 | 2.25 | 35 |
| 3 | 80 | 3.20 | 40 |

Films were cast from the above solution and such films were heated. After heating at 150° C. for 30 minutes, the films were insoluble in acetone, hard and flexible.

Example 19

93.75 parts of methyl methacrylate, 2.5 parts of methacrylic acid and 3.75 parts of glycidyl methacrylate were mixed with 0.38 part of benzoyl peroxide and partially copolymerized to a moderately viscous syrup by heating at 55° C. for 1.5–2.5 hours. After removal of any dissolved air by evacuation, the syrup was poured into an elongated glass cell and heated at 55° C. for 16–18 hours. The resultant thermoplastic sheet, having a thickness of 0.25 inch, was then heated at 100° C. for one hour in order to complete the linear vinyl copolymerization. The heat distortion temperature of the sheet was then found to be 95° C.

The above thermoplastic sheet was heated at 140° C. for one hour at which time it had a heat distortion temperature of 100° C. After another heating period of one hour at 140° C. the heat distortion temperature was found to be 103° C.

The procedure for determining the heat distortion temperature of the above polymeric material consisted of centrally loading a four inch span of the sheet to a maximum fibre stress or 264 p. s. i. in a bath the temperature of which was raised from 25° C. at a rate of 2° C. per minute. The temperature at which the sheet deflected 0.01 inch was taken as the heat distortion temperature.

Example 20

The procedure of Example 19 was repeated with 87.5 parts of methyl methacrylate, 5 parts of methacrylic acid and 7.5 parts of glycidyl methacrylate. The thermoplastic sheet obtained had a heat distortion temperature of 95° C. After heating at 140° C. for one hour and two hours, the heat distortion temperature was found to be 107° C. and 113° C., respectively.

Example 21

80 parts of vinyl acetate, 10 parts of crotonic acid and 10 parts of glycidyl crotonate were copolymerized in separate experiments by heating at 70° C. for 16 hours in 60 parts of methyl isobutyl ketone and in the presence of 2, 3 and 4 parts of benzoyl peroxide. The following table shows the amount of benzoyl peroxide used and the degree of conversion of the monomers after the heating period.

| Benzoyl Peroxide, Parts | Conversion, percent |
|---|---|
| 2 | 79.8 |
| 3 | 96.5 |
| 4 | 99.5 |

Films were cast from the above copolymer solutions and such films were heated. After heating at 150° C. for 45 minutes, the films were insoluble in acetone, hard and flexible.

Example 22

By heating at 70° C. for 15 hours, in the presence of 4 parts of lauroyl peroxide, a solution of 80 parts of vinyl acetate, 10 parts of crotonic acid and 10 parts of glycidyl crotonate in 60 parts of methyl isobutyl ketone, there was obtained an 82.6% conversion of the monomers to a linear thermoplastic copolymer.

Example 23

In 40 parts of methyl isobutyl ketone and 20 parts of methyl ethyl ketone, there were dissolved 80 parts of vinyl acetate, 10 parts of crotonic acid and 10 parts of glycidyl crotonate, and the solution was heated at 70° C. for 15 hours in the presence of 2 parts of benzoyl peroxide and 1 part of azo-bis(isobutyronitrile). An 84% monomer conversion to a linear thermoplastic copolymer was thus obtained.

The above monomer conversion was increased to 89.6% by using one more part of benzoyl peroxide.

Example 24

80 parts of vinyl acetate, 10 parts of crotonic acid and 10 parts of glycidyl crotonate were copolymerized in separate experiments by heating at 70° C. for 15 hours in various amounts of inert solvents and in the presence of 4 parts of benzoyl peroxide. The following table shows the amount of solvent used, the degree of conversion of the monomers after the heating period and the viscosity of the linear thermoplastic copolymer solutions obtained:

| Methyl Isobutyl Ketone, parts | Methyl Ethyl Ketone, parts | Amyl Acetate, parts | Butanol, parts | Conversion, percent | Viscosity, poises |
|---|---|---|---|---|---|
| 60 | | | | 94 | 15 |
| | 60 | | | 85 | 1.25 |
| 40 | 20 | | | 89.6 | 6.27 |
| | | 60 | | 96.5 | .80 |
| | | 20 | | 86.6 | 22.7 |
| | | | 60 | 90.8 | 12.9 |

Films cast from the above solutions and heated at 150° C. for 45 minutes were acetone insoluble, hard and flexible.

*Example 25*

In 32 parts of butanol and 19 parts of methyl isobutyl ketone, there were dissolved 72.6 parts of vinyl acetate, 6.6 parts of ethyl acrylate, 3 parts of vinyl stearate, 10 parts of crotonic acid and 10 parts of glycidyl crotonate, and the solution was heated at 70° C. for 18 hours in the presence of benzoyl peroxide. A 93% monomer conversion to a linear thermoplastic copolymer was thus obtained.

A film was cast from the copolymer solution and heated. After heating at 150° C. for 45 minutes, this film was insoluble in acetone, hard and flexible.

The above-detailed examples illustrate certain embodiments of the invention wherein the glycidyl esters and the acrylic, methacrylic or crotonic acids are copolymerized with specific monoethylenically unsaturated compounds free of groups reactive with epoxide rings, such as carboxylic acid groups, hydroxyl groups and amino groups, and free of groups reactive with carboxylic acid groups, such as epoxide rings. The present invention, however, is not restricted to such specific unsaturated compounds.

The monoethylenically unsaturated compound can be any polymerizable monoethylenically unsaturated compound, provided only that it contains no groups reactive with epoxide rings and carboxylic acid groups, i. e. provided only that it contains no groups capable of reacting with the glycidyl ester and the acrylic, methacrylic or crotonic acid, i. e. no active hydrogen-containing groups and no epoxide groups. Illustrative compounds which can be used are acrylic, haloacrylic, methacrylic esters, nitriles and amines, such as, for example, acrylonitrile, methacrylonitrile, methyl acrylate, ethyl acrylate, butyl acrylate, isobutyl acrylate, octyl acrylate, dodecyl acrylate, methoxymethyl acrylate, chloroethyl acrylate and the corresponding esters of methacrylic and alpha-chloroacrylic acids; vinyl and vinylidene halides, e. g. vinyl chloride, vinyl fluoride, vinylidene chloride, vinylidene fluoride; vinyl carboxylates, e. g. vinyl acetate, vinyl chloroacetate and vinyl propionate; and vinyl aryls, e. g. styrene and vinyl naphthalene.

The catalyst concentration, the time and the temperature for carrying out the linear copolymerization are dependent upon one another. Generally, the lower the catalyst concentration and/or the temperature, the longer the time to effect the reaction. However, the temperature must be kept below the temperature where gelation occurs by interaction of the acid and epoxide groups. It is preferred to effect the copolymerization by heating the monomers at 50°–75° C. in the presence of 0.5–5% catalyst, based on the weight of the monomer charge.

As illustrated in Example 1, solution Nos. 8, 11 and 12, in order to avoid interaction of the acid and epoxide groups during the linear copolymerization, the acid and glycidyl ester together must be present in an amount not exceeding 20% by weight of the total polymerizable mass.

As previously mentioned, the acid and glycidyl ester each must be used in an amount sufficient to cause cross-linking of the copolymer upon heat treatment. Satisfactory cross-linking occurs with concentrations of glycidyl ester as low as 1.5% and concentrations of acid as low as 1% by weight of the total polymerizable mass.

Although it is preferable to effect the copolymerization in the presence of one or more inert solvents, such as esters, ketones and mixtures of hydrocarbons with esters and/or ketones, it is possible to effect it in the absence of solvents. Example 17 illustrates the preparation of the linear copolymer by emulsion polymerization and Examples 19 and 20 illustrate a bulk polymerization process.

The catalysts which can be used for the copolymerization are not limited to the disclosure of the above example. Generally, addition polymerization catalysts are effective, such as peroxide, persulphate and azo catalysts. By azo catalysts are meant compounds which have the formula

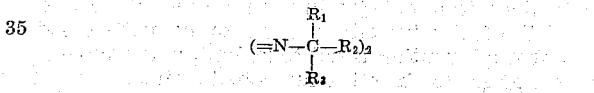

wherein R1 is a lower alkyl, including cycloalkyl, radical, R2 is a low alkyl, aryl or cycloalkyl radical and R3 is a carbonitrile, carbonamide or carbalkoxy radical. Particularly preferred are those azo compounds wherein both valences of the azo group are satisfied by completely aliphatic radicals bonded to the nitrogen from tertiary aliphatic carbon further bonded to a nitrile substituent. Illustrative catalysts which can be used are acetyl peroxide, benzoyl peroxide, benzoyl acetyl peroxide, tertiary butyl perbenzoate, lauryl peroxide, dibutyryl peroxide, succinyl peroxide, tertiary alkyl hydroperoxides such as tertiary butyl hydroperoxide, di(tertiary alkyl) peroxides such as di(tertiary butyl) peroxide, potassium persulphate, azo-bis(alpha,gamma-dimethylvaleronitrile), azo - bis(dimethylbutyronitriles), azo-bis(alpha-methyl butyronitrile), azo-bis(alpha-ethylbutyronitrile), dimethyl and diethyl azo-bis(isobutyrates), azo-bis(isobutyrocarbonamide), azo - bis(alpha,gamma-dimethylcapronitrile), azo - bis(alpha - isobutyl - gamma-methylvaleronitrile), azo-bis(alpha-n-butylcapronitrile), azo - bis(alpha - methylcapronitrile), azo - bis(alpha,beta-beta-trimethylbutyronitrile), azo-bis-(cyclopentylpropionitrile), azo-bis(cycloheptylpropionitrile), azo - bis(cyclopropylpropionitrile), azo - bis(cyclohexylpropionitrile) and azo-bis(alpha-phenylpropionitrile).

The process of this invention makes possible the preparation of new cross-linked vinyl-type copolymers with intermediate formation of thermoplastic vinyl-type copolymers. As shown in the foregoing examples, the cross-linking can be obtained in articles produced from a solution containing the thermoplastic vinyl-type copolymer.

The invention provides a simple and easilycontrolled process for preparing linear thermoplastic vinyl-type copolymers and for directly cross-linking these copolymers. The cross-linked copolymers of this invention are not attacked by water and the common organic solvents and have improved thermal properties. The invention thus provides a simple, direct method for the direct transformation of a thermoplastic polymeric material into one that is not attacked by water and other organic solvents. The process does not give rise to the formation of undesirable by-products, the cross-linked polymeric product finally obtained being free of undesirable substances.

As already mentioned, the new vinyl-type copolymers of this invention are particularly useful in the protective coating field inasmuch as they can be applied very easily to articles to be coated in the thermoplastic state and thereafter cross-linked by a mere baking operation. The majority of the cross-linking processes heretofore used in protective coatings depend upon the action of the oxygen of the air on unsaturated bonds present in the polymer. Since rate of diffusion of the oxygen through the film is a controlling factor in rate of cure, even baked films embrittle with age. The cross-linking mechanism of this invention does not depend upon the diffusion of a gas into the film and once the coating has been properly baked, the reaction is complete and no further hardening can occur.

Since it is obvious that many changes and modifications can be made in the above-described details without departing from the nature and spirit of the invention, it is to be understood that the invention is not to be limited thereto except as set forth in the appended claims.

Having thus described our invention what we claim is:

1. A linear thermoplastic copolymer of glycidyl acrylate, acrylic acid, styrene and methyl acrylate, the glycidyl acrylate and acrylic acid each being present in an amount sufficient to cause cross-linking of the copolymer upon heat treatment and together being present in an amount not exceeding 20% by weight of the total polymerizable mass.

2. A linear thermoplastic copolymer of glycidyl methacrylate, merthacrylic acid, styrene and methyl acrylate, the glycidyl methacrylate and methacrylic acid each being present in an amount sufficient to cause cross-linking of the copolymer upon heat treatment and together being present in an amount not exceeding 20% by weight of the total polymerizable mass.

3. The cross-linked polymeric material obtained by heating at a temperature of from 100° C. to 150° C. the copolymer of claim 10.

4. The cross-linked polymeric material obtained by heating at a temperature of from 100° C. to 150° C. the copolymer of claim 11.

5. The cross-linked polymeric material obtained by heating at a temperature of from 100° C. to 150° C. the copolymer of claim 12.

6. The cross-linked polymeric material obtained by heating at a temperature of from 100° C. to 150° C. the copolymer of claim 4.

7. The cross-linked polymeric material obtained by heating at a temperature of from 100° C. to 150° C. the copolymer of claim 13.

8. The cross-linked polymeric material obtained by heating at a temperature of from 100° C. to 150° C. the copolymer of claim 14.

9. The cross-linked polymeric material obtained by heating at a temperature of from 100° C. to 150° C. the copolymer of claim 2.

10. A linear thermoplastic copolymer of a glycidyl ester selected from the group consisting of glycidyl acrylate, glycidyl methacrylate and glycidyl crotonate, an acid selected from the group consisting of acrylic acid, methacrylic acid and crotonic acid, and at least one polymerizable monoethylenically unsaturated compound free of groups reactive with epoxide rings and carboxylic acid groups, said ester and acid each being present in an amount sufficient to cause cross-linking of the copolymer upon heat treatment and together being present in an amount not exceeding 20% by weight of the total polymerizable mass.

11. A linear thermoplastic copolymer of glycidyl acrylate, an acid selected from the group consisting of acrylic acid, methacrylic acid and crotonic acid, and at least one polymerizable monoethylenically unsaturated compound free of groups reactive with epoxide rings and carboxylic acid groups, said glycidyl acrylate and acid each being present in an amount sufficient to cause cross-linking of the copolymer upon heat treatment and together being present in an amount not exceeding 20% by weight of the total polymerizable mass.

12. A linear thermoplastic copolymer of glycidyl acrylate, acrylic acid, and at least one polymerizable monoethylenically unsaturated compound free of groups reactive with epoxide rings and carboxylic acid groups, said glycidyl acrylate and acrylic acid each being present in an amount sufficient to cause cross-linking of the copolymer upon heat treatment and together being present in an amount not exceeding 20% by weight of the total polymerizable mass.

13. A linear thermoplastic copolymer of glycidyl methacrylate, an acid selected from the group consisting of acrylic acid, methacrylic acid and crotonic acid, and at least one polymerizable monoethylenically unsaturated compound free of groups reactive with epoxide rings and carboxylic acid groups, said glycidyl methacrylate and acid each being present in an amount sufficient to cause cross-linking of the copolymer upon heat treatment and together being present in an amount not exceeding 20% by weight of the total polymerizable mass.

14. A linear thermoplastic copolymer of glycidyl methacrylate, methacrylic acid, and at least one polymerizable monoethylenically unsaturated compound free of groups reactive with epoxide rings and carboxylic acid groups, said glycidyl methacrylate and methacrylic acid each being present in an amount sufficient to cause cross-linking of the copolymer upon heat treatment and together being present in an amount not exceeding 20% by weight of the total polymerizable mass.

15. A process for the preparation of a linear thermoplastic copolymer capable of cross-linking upon heat treatment which comprises heating together, at a temperature of from 50° C. to 75° C. and in the presence of an addition polymerization catalyst, a glycidyl ester selected from the group consisting of glycidyl acrylate, glycidyl methacrylate and glycidyl crotonate, an acid selected from the group consisting of acrylic acid, methacrylic acid and crotonic acid, and at least one polymerizable monoethylenically unsaturated compound free of groups reactive with epoxide rings and carboxylic acid groups, said ester and acid each being present in an amount sufficient to cause cross-linking of the copolymer upon heat treatment and together being present in an amount not exceeding 20% by weight of the total polymerizable mass.

16. A process for the preparation of a linear thermoplastic copolymer capable of cross-linking upon heat treatment which comprises heating together, at a temperature of from 50° C. to 75° C. and in the presence of azo-bis(isobutyronitrile) as a catalyst, a glycidyl ester selected from the group consisting of glycidyl acrylate, glycidyl methacrylate and glycidyl crotonate, an acid selected from the group consisting of acrylic acid, methacrylic acid and crotonic acid, and at least one polymerizable monoethylenically unsaturated compound free of groups reactive with epoxide rings and carboxylic acid groups, said ester and acid each being present in an amount sufficient to cause cross-linking of the copolymer upon heat treatment and together being present in an amount not exceeding 20% by weight of the total polymerizable mass.

JOHN ALEXANDER BILTON.
GORDON HART SEGALL.

REFERENCES CITED

The following references are of record in the file of this patent:

UNITED STATES PATENTS

| Number | Name | Date |
| --- | --- | --- |
| 2,470,324 | Staudinger et al. | May 17, 1949 |
| 2,530,983 | Minter | Nov. 21, 1950 |